April 28, 1953   S. C. VAHEY ET AL   2,636,749
CROSSBEAM AND ACCESSORY ATTACHMENT
TO AUTOMOBILE STRUCTURES Filed March 22, 1950

INVENTORS
Stanley C. Vahey
Harold G. Kain
BY Maurice A. Crewe
ATTORNEY

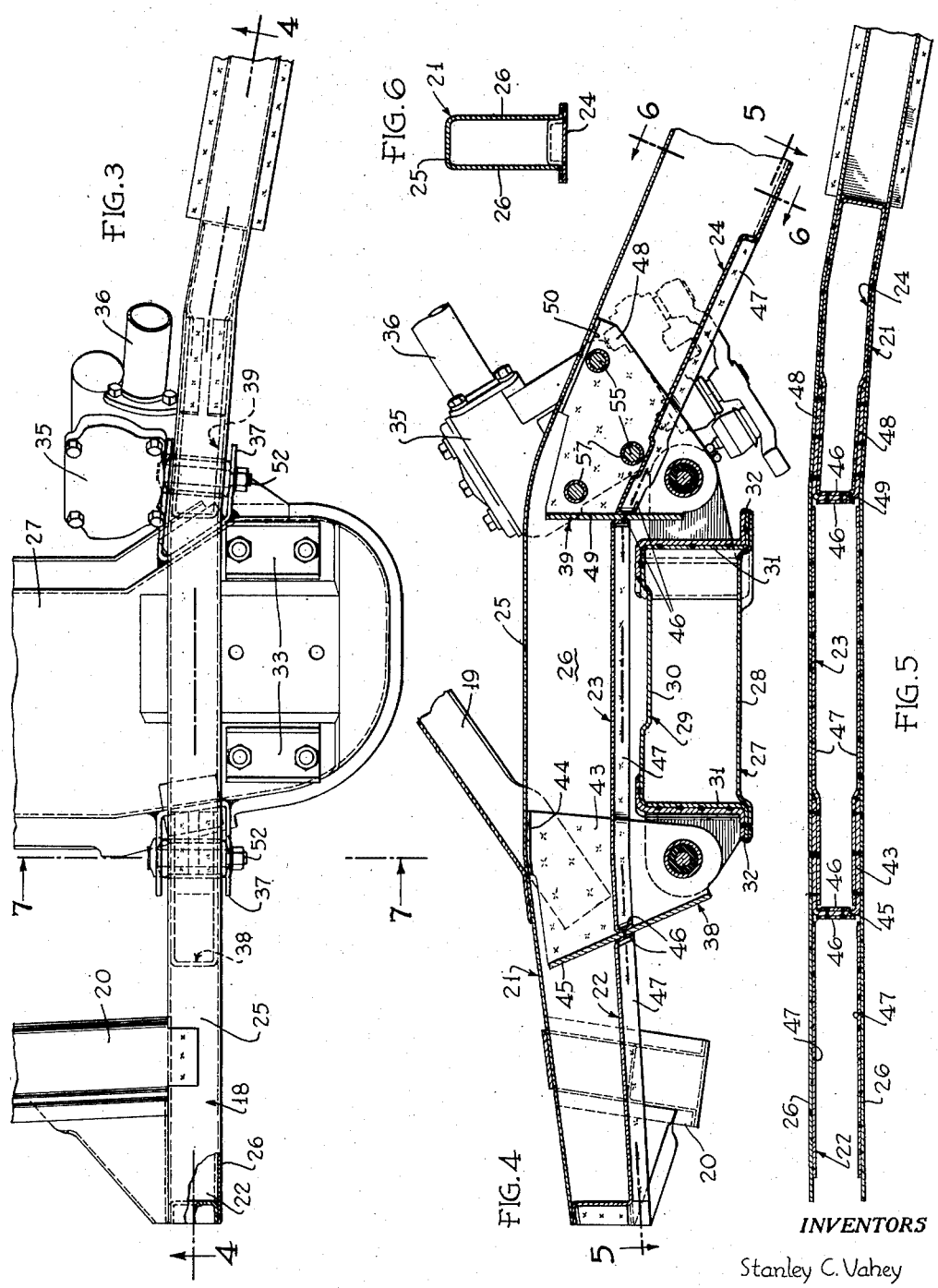

April 28, 1953  S. C. VAHEY ET AL  2,636,749
CROSSBEAM AND ACCESSORY ATTACHMENT
TO AUTOMOBILE STRUCTURES
Filed March 22, 1950  3 Sheets-Sheet 3
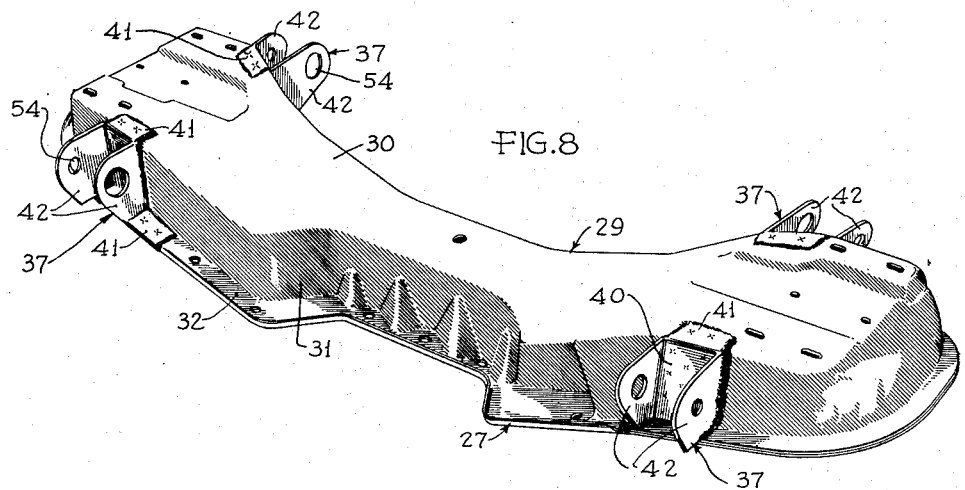
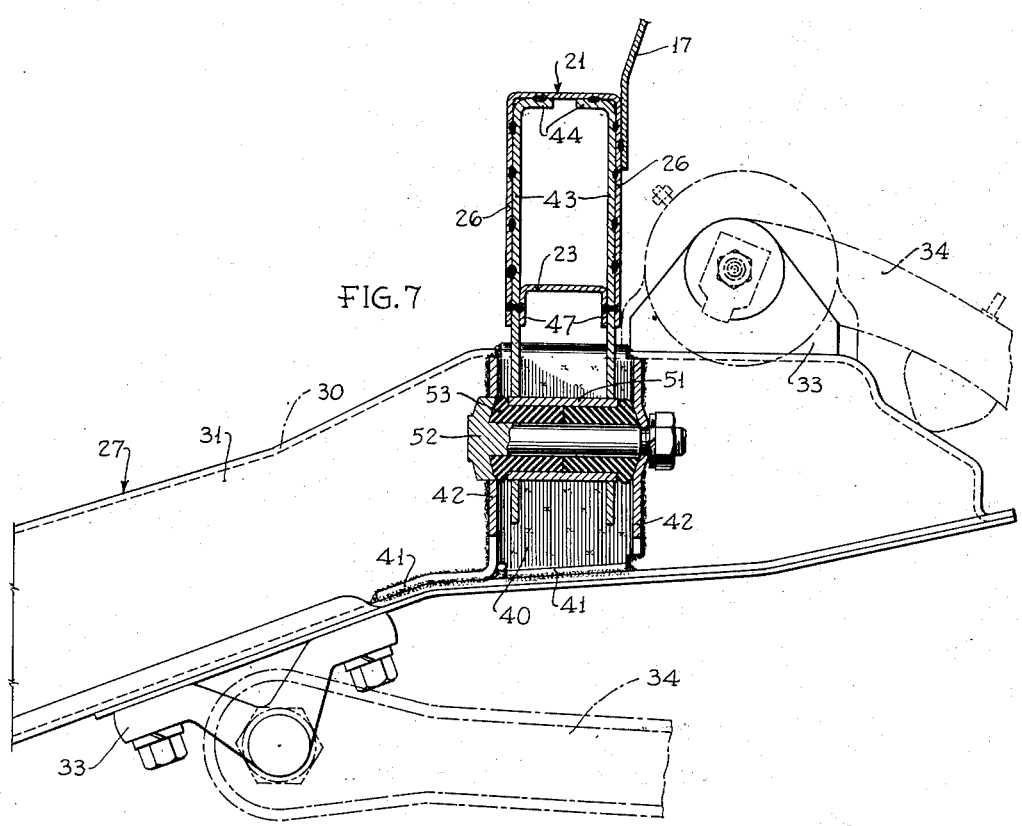
INVENTORS
Stanley C. Vahey
Harold G. Kain
BY Maurice A. Crews
ATTORNEY Patented Apr. 28, 1953

2,636,749

UNITED STATES PATENT OFFICE 2,636,749

CROSSBEAM AND ACCESSORY ATTACHMENT TO AUTOMOBILE STRUCTURES

Stanley C. Vahey, Detroit, and Harold G. Kain, Grosse Pointe, Mich., assignors to The Budd Company, Philadelphia, Pa., a corporation of Pennsylvania Application March 22, 1950, Serial No. 151,206

8 Claims. (Cl. 280—106)

1

The invention relates to the attachment of a cross beam, specifically a beam supporting the front wheels, and of other accessories, specifically the steering gear, to the framework of an automobile, such as to the structure of an automobile of the self-supporting type.

The object of the invention is to overcome certain difficulties stemming from the low arrangement of modern automobile bodies, from the necessary intersection of the transverse wheel supporting beam and longitudinally extending parts of the framework, and from the location of the steering gear close to the wheel supporting beam.

The aforesaid objects are achieved and the briefly outlined difficulties are overcome by providing the underframe of an automobile with downwardly projecting brackets engaged by brackets longitudinally projecting from the wheel supporting cross beam, and by forming the brackets on the underframe as reinforcements for the attachment of the steering gear.

In some respects the invention may be considered as a further development, modification or improvement of applicant's co-pending application Serial No. 92,362, filed May 10, 1949, now abandoned, for "Connection Between Longitudinal Sills and Transverse Wheel Support Beams of Automobiles."

The invention and its objects and advantages are more completely disclosed in the following description of one embodiment, and by the illustration of such embodiment in the attached drawing.

In the drawing:

Figure 3 is a fragmentary plan view of one of the forward side frame members, of adjoining parts of a transverse wheel supporting beam, and of the steering gear.

Figure 4 is a fragmentary vertical longitudinal section along line 4—4 of Figure 3.

Figure 5 is a fragmentary horizontal longitudinal section through one of the body side sills or frame members along line 5—5 of Figure 4.

Figure 6 is a transverse section along line 6—6 of Figure 4.

Figure 7 is a transverse section through one of the body side sills along line 7—7 of Figure 3, and a fragmentary front elevation of the wheel

2 supporting axle beam; part of the links for guiding the wheel being fragmentarily indicated in dot-and-dash lines.

Figure 8 is a three-quarter front perspective of the wheel supporting beam stripped of all removable parts.

Figure 2:
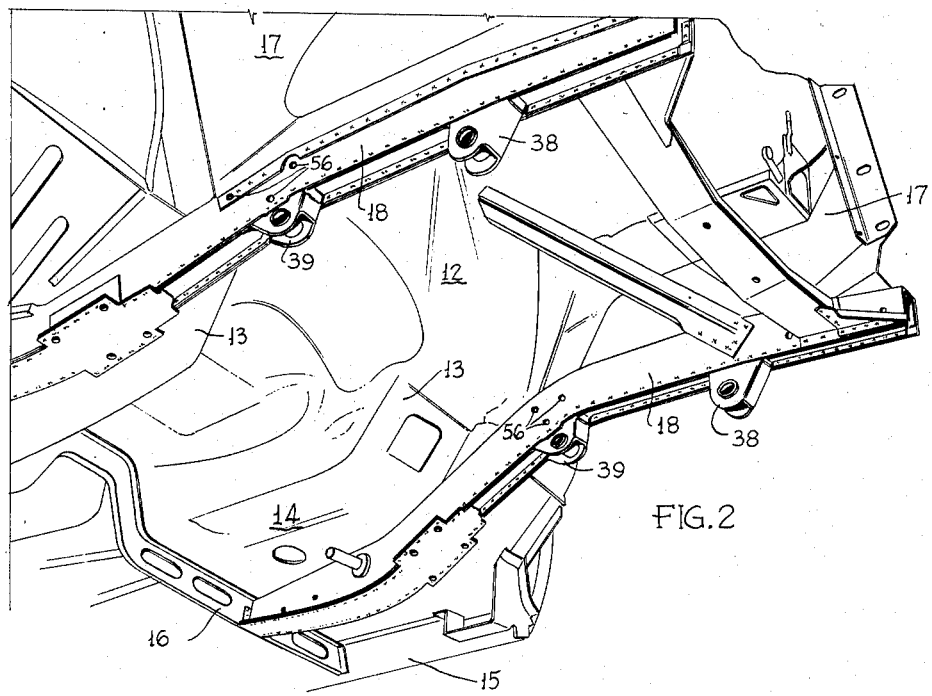
Figure 2 is a fragmentary three-quarter front and underside perspective of the structure shown in Figure 1.
Figure 1:
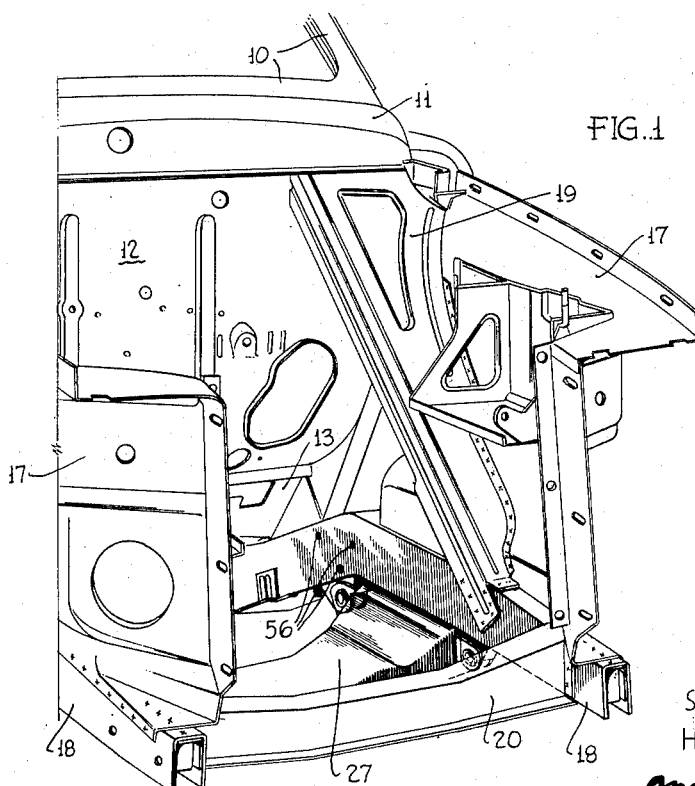
Figure 1 is a fragmentary three-quarter front perspective of the motor compartment region of a self-supporting automobile body.

Figures 1 and 2 of the drawing show the forward part of a sheet metal, combined automobile body and chassis having a windshield frame 10, a cowl top 11, a dashboard or shroud panel 12, a toe-board or panel 13, and a floor panel 14. The sides of the body are reinforced by threshold or main side sills 15, of which one is visible in Figure 2. A transverse brace 16 inter-connects sills 15 in rear of toe-board 13 and is secured to the underside of floor panel 14.

The side walls of the body, not visible in the drawing, are forwardly extended by panels 17, which constitute the inner walls of the housings for the front wheels (not shown) and the side walls of the motor compartment. The rear wall of the motor compartment is formed by panels 12 and 13. Secured to the lower margins of panels 17 are forward or end sill members 18, the rear or inner ends of which are secured to cross-brace 16 and to the underside of floor panel 14. Inclined braces 19 extend between end portions of sill members 18 and the upper region of dashboard 12 and have their outer margins throughout connected to the respective wall extensions 17. An end cross-brace 20 permanently interconnects the outer ends of sill members 18 and serves as front support for the motor unit. The motor unit and its rear support are not shown.

The sill members 18 are closed box sections each formed by an inverted channel section 21 and a multi-piece bottom wall 22, 23, 24. Section 21 has a top web 25 and side walls 26. The connection of section 18 and of the bottom wall members 22, 23, 24, as well as the shape of the latter, will be described later on.

A closed box section axle beam 27 is formed of a bottom plate 28 and an inverted hat section 29. Section 29 has a top web or wall 30, side walls 31, and marginal bottom flanges 32, the latter connected to bottom wall 28. Brackets 33, secured to axle beam 27, swingably carry links 34 for vertically guiding the road wheels. Steering gear 35 with steering column 36 is fragmentarily shown in Figures 3 and 4. The road wheels and the resilient means for their support, as well as the linkage system connecting steering gear 35 with the wheels, are not shown.

The structure described so far is substantially of known design and is in many respects similar to the construction illustrated in applicant's copending prior application above referred to.

Axle beam 27 passes with small spacing beneath sill members 18 and is connected to them by brackets 37 on axle beam 27 and by front or outer brackets 38 and rear or inner brackets 39 on sill members 18.

Brackets 37 on beam 27 project horizontally forwardly and rearwardly respectively beyond the vertical walls thereof and are U-shaped in plan view, having the web 40 secured to the respective upright wall 31 and flanges 41 secured to top wall 30 and bottom flanges 32 by spot welding and fusion welding, as indicated in Figures 3, 4, 7, and 8 of the drawing. The legs 42 of brackets 37 extend generally in the longitudinal direction of the sill members 18.

Each bracket 38 is generally of U-section in plan view having its legs 43 overlappingly secured to the inside of the side walls 26 of sill 18 and top flanges 44 secured to the top web 25 of sill 18. Web 45 of bracket 38 passes between front member 22 and middle member 23 of the bottom wall of the respective sill member 18 and is secured to transverse flanges 46 provided on the members 22, 23. Downwardly projecting flanges 47 of members 22, 23 are secured to the side walls 26 of the sill members 18. The flanges 47 of member 23 are joggled to make room for the passage of legs 43 of bracket 38. Bracket 38 is arranged in the connecting region between sill member 18 and the outer end of the respective inclined brace 19. This arrangement results in the transmission of stresses from beam 27 directly into said brace, and thence into the upper part of the adjoining main part of the body. See Figures 3, 4, 5, and 7.

The rear or inner bracket 39 is likewise of U-section in plan view, having wider longitudinally extending legs or side walls 48 than those of brackets 38. Legs 48 are overlappingly secured to the inside of the side walls 26 and fitted between the said walls and the lateral flanges 47 of rear bottom wall member 24 of sill member 18. Bottom wall or web 49 of bracket 39 passes between and is secured to the transverse flanges 46 of bottom wall members 23, 24. Bracket 39 has also top flanges 50 secured to the top wall or web 25 of sill 18. See Figures 3 to 5.

The relative transverse widths of brackets 37, 38, 39 are such that the portion of brackets 38, 39 projecting downwardly beyond the sill members 18 fits between the legs of the respective brackets 37. Brackets 38, 39 have their respective legs 43, 48 provided with registering holes in which a sleeve 51, inter-connecting the legs, is fitted and firmly secured, such as by welding—Figures 4 and 7. A bolt 52 surrounded by sleeves 53 of elastomer material, such as rubber, passes through sleeve 51 and holes 54 in the legs 42 of the respective bracket 37 (Figures 7 and 8). The details of this resilient sleeve and bolt connection may be of known design; it serves for blocking the transfer of vibrations from the wheels to the frame and body, while securely holding the axle beam 27.

The connection between the sill members 18 of the vehicle and the wheel supporting beam 27 by means of longitudinally spaced, downwardly projecting brackets 38, 39 on the sill members and by longitudinally projecting brackets 37 on the beam, has a number of important advantages. It permits the passage of sill members 18 and beam 27 without requiring intricate offsets of one or both of these parts; it provides for an attachment of beam 27 at longitudinally widely spaced points so as to prevent tilting of the beam and to safely transfer brake reactions and other torsional forces; the parts entering into the structure can be easily and economically manufactured and connected with each other; and it provides for an arrangement which does not interfere with the desired location of steering gear 35.

A further feature and advantage of the new construction consists in that rear bracket 39 lends itself for the attachment of steering gear 35, as best shown in Figures 3 and 4. The sides or legs 48 of bracket 39 are so wide as to reinforce the respective sill member 18 where bolts 55 pass through holes 56 in the sill walls 26 of sill member 18 and in legs 48 of bracket 39. The opposite walls 26, 48 are transversely braced against each other by sleeves 57 registering with the holes 56 and surrounding the bolts 55.

Though the drawing illustrates only the steering gear proper attached to one of the sill members 18, the opposite sill member 18 may carry in the same location and the same manner a bearing for a swinging arm forming part of the steering linkage system. Note the holes 56 in sill member 18 remote from the onlooker in Figures 1 and 2, and the corresponding holes 56 in sill member 18 on the side of the onlooker in Figure 2.

The underframe structure and the beam 27 consist practically throughout of sheet metal stampings inter-connected by welds which are conventionally indicated in the drawing. The invention, in its broader aspects is, however, not restricted to sheet metal and weld connections.

It will be understood that in general the invention is not restricted to the details of the illustrated and described embodiment but that it is susceptible to modifications and adaptations. Specifically, it will be understood that the details of the invention will depend in part on the construction of the body or of other types vehicle frame, as well as on the form and construction of the axle beam to which the invention is applied. For instance, the new bracket connection may be provided on one side of the beam only. The invention is, to indicate a further modification, applicable to the attachment of beams serving for other purposes than for holding the road wheels; the beam may carry the motor with or without the road wheel. The invention may be applied to the rear end or to a mid-region of an automobile.

What is claimed is:

1. In an automobile structure: an underframe; a transverse beam arranged beneath said underfame and extending beyond the sides thereof, said beam forming a support for road wheels; a first set of brackets integrally connected with said underframe near the side margins thereof and arranged in front and in rear of said beam, said brackets projecting downwardly beyond said underframe; a second set of brackets integrally connected with said beam and projecting forwardly and rearwardly beyond said beam; the brackets of said first set and of said second set having portions overlapping each other; and means inter-connecting said overlapping portions, including vibration-absorbing inserts, between each two adjacent brackets of different sets.

2. In an automobile structure: a pair of longitudinal side sill members spaced transversely from each other; a transverse beam arranged beneath said sill members and extending laterally therebeyond; a first set of brackets integrally connected with and projecting downwardly beyond said sill members and arranged in front and in rear of said beam; a second set of brackets integrally connected with and projecting forwardly and rearwardly beyond said beam; portions of said brackets of said two sets overlapping each other; and vibration-absorbing means inter-connecting said overlapping portions of each two adjacent brackets of different sets.

3. In an automobile structure: an underframe; a transverse beam arranged beneath said underframe and extending beyond the sides thereof; a first set of brackets secured to said underframe near the side margins thereof and arranged on at least one of the front and rear side of said beam, said brackets projecting downwardly beyond said underframe; a second set of brackets secured to and projecting longitudinally beyond said beam; means connecting the brackets of said first set and of said second set and including vibration absorbing inserts.

4. In a vehicle body of the combined body and chassis type, a transverse beam, a pair of longitudinally extending, transversely spaced sill members of hollow section, each having transversely spaced upright walls, brackets associated with said sill members, being U-shaped in plan view and having their arms overlappingly secured to both said upright walls of said sill members, said brackets extending downwardly beyond said sill members and having downwardly projecting portions connected with brackets projecting longitudinally from said transverse beam.

5. In an automobile body, a transverse beam, a longitudinally extending sill member of hollow section having transversely spaced upright walls, a bracket constituting a reinforcement for said sill member in the attachment region for a part of a steering gear, said bracket having a pair of longitudinally extending upright arms overlappingly secured to said upright walls and presenting a reinforcing brace, said bracket extending downwardly beyond said sill member and the projecting portions being connected with a bracket projecting longitudinally from said transverse beam.

6. In a vehicle body of the combined body and chassis type, an end wall, a pair of longitudinally extending, transversely spaced underframe sill members projecting beyond said end wall and each having a pair of transversely spaced upright walls, inclined braces between said end wall and points of said sill members spaced from said end wall, brackets associated with said sill members in the regions of said points where said braces and sill members meet, said brackets extending downwardly beyond said sill members for the connection with a transverse beam such as a wheel and motor supporting beam.

7. In an automobile structure: a longitudinally extending, transverse, hollow-section sill member, said member having transversely spaced upright walls inter-connected by a bottom wall, a bracket U-shaped in plan view having longitudinally extending legs overlappingly secured to said upright walls, said bracket extending downwardly beyond said sill member, said bracket having a transversely arranged web passing through an interruption in said bottom wall and connected to the latter, the bracket having its downwardly projecting portion adapted for the connection with another member of the structure.

8. In a structure according to claim 7, said bottom wall having transverse flanges on the sides of said web, and said flanges being overlappingly secured to said web.

STANLEY C. VAHEY.
HAROLD G. KAIN.

References Cited in the file of this patent

UNITED STATES PATENTS

| Number | Name | Date |
| --- | --- | --- |
| 1,727,999 | Moorhouse | Sept. 10, 1929 |
| 2,315,643 | Mueller | Apr. 6, 1943 |
| 2,351,233 | Schon | June 13, 1944 |
| 2,417,690 | Keller | Mar. 18, 1947 |
| 2,611,625 | Kishline et al. | Sept. 23, 1952 |